June 2, 1931. A. W. ANDERNACH 1,808,590
METHOD OF MANUFACTURING PAPER, PASTEBOARD, FELT, AND THE LIKE
Filed Dec. 5, 1929
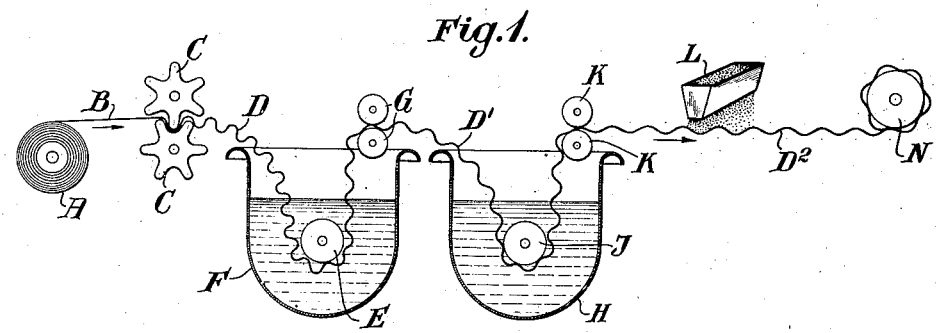
  
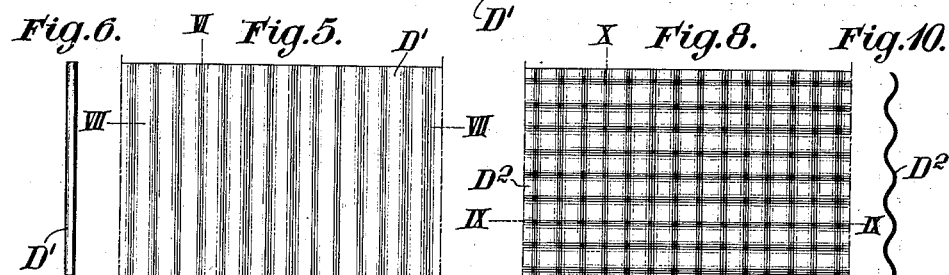
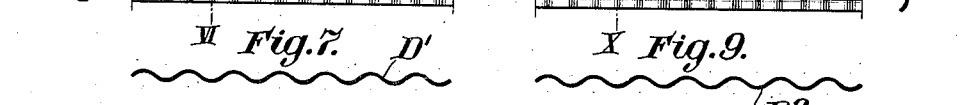
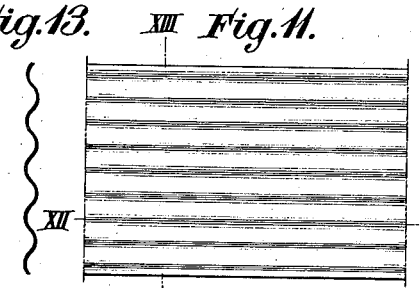
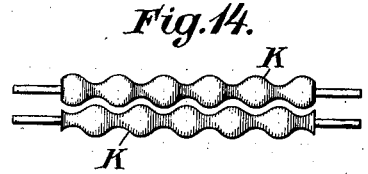
Inventor
August Wilhelm Andernach
by *[signature]*
his Attorney Patented June 2, 1931

1,808,590

UNITED STATES PATENT OFFICE

AUGUST WILHELM ANDERNACH, OF BEUEL, GERMANY

METHOD OF MANUFACTURING PAPER, PASTEBOARD, FELT AND THE LIKE

Application filed December 5, 1929, Serial No. 411,778, and in Germany September 3, 1928.

This invention relates to roofing and insulating materials and more particularly refers to improvements in roofing and insulating sheets of the type generally comprising a base of fibrous material to which a plastic impregnating or coating substance is applied in order to render the material water-proof, and also relates to improvements in methods of manufacturing materials of the character mentioned.

When papers, paste-boards, felts, and the like, which have been made water-proof by a suitable impregnation or coating, are used for insulating purposes, or for roofing purposes, it frequently occurs that irregular bulges and wrinkles arise in them even after said materials have been in use for some time. At times this takes place only after the material concerned has already laid in place for a shorter or longer time. Immediately after the papers etc., have been laid, their surface is completely smooth, without any bulging or warped or undulated portions, but in spite of any care exerted in laying, these objectionable irregularities make their appearance after some time. This is the case especially if fewer animal fibres, but more vegetable ones, such as wood, cellulose, jute and the like, have been used in the manufacture of the raw material, or if these latter, for instance paper waste, contained mineral substances, as is the case especially with wrapper paste-boards, wrapper paper, harder felts and harder feltboards, or if still worse, mineral substances have been used as loading materials.

Also the condition or state of a covering that may, perhaps, have been used, plays an important part. With well soaked tarred roofing paste-boards that have been manufactured chiefly of wool rags and are provided with a thick covering of pitch or tar, as well as with a suitably thick layer of sand, the warping and the formation of undulations occurs more rarely. On the other hand, the roofing paste-boards etc., soaked or coated with a tar-free substance or composition are very inclined to form bulges etc.; it is, in fact, a rule with them to do so. For this reason, tar-free roofing paste-boards are laid on roofs to run from the house-gutter upwards to the ridge, the edges being nearly always covered with strips of fabric glued in place in order to prevent side-rain, shifting snow, soot, dust and the like, from finding access therebelow. The object in laying the roofing material in the direction from the house-gutter to the ridge is to prevent rain water from being intercepted or retained by the bulges that extend almost exclusively in the longitudinal direction of the sheets and are often times several inches high. However, it also happens that such roofing paste-boards, roofing felts, or the like, tear either while they are being laid or soon thereafter, if the laying (or, may be, the preceding storing) has taken place under circumstances causing them to contract, and if during the laying or thereafter circumstances arise by which the contraction is increased.

In view of the severe disadvantages resulting from the formation of the bulges and warpings in the materials mentioned numerous efforts have heretofore been made towards preventing their occurrence, but these have not led to the desired complete and permanent success. It is the object of the present invention to bring about conditions whereby these drawbacks will be successfully overcome.

It is known that in order to manufacture soaked undulated paste-boards, papers, felts, and the like, especially ribbed building paste-boards, the respective materials are first, prior to the soaking, undulated by means of known devices and machines while they are in their raw state. In order to make them fit for their purpose, viz. fit for use as water-repulsing undulated insulating material, these raw and non-soaked paste-boards etc. are dipped into suitable liquid substances, for instance hot molten soft tar-pitch or a suitable bituminous substance. This dipping procedure with the ensuing drawing off of the surplus coating or impregnating material is for this particular purpose, in which the maintenance of the undulations is very essential, the natural procedure. Conducting the thus treated sheets through squeezing rollers or drawing them through scraping devices is out of the question in view of the stated purpose for which they are prepared as then the undulations would be damaged or destroyed.

Now, in the course of endeavors directed to overcome the drawbacks stated, I have discovered that if undulated paste-boards, papers, felts, or the like, are being dipped into, or drawn through, soaking materials, as is customary in the manufacture of roofing paste-boards, and if then the thus treated sheets are led through rollers or scraping devices by which the superfluous mass is removed and whereby the formerly existing undulations are wholly or nearly destroyed or are, at best, maintained only very superficially, I say, if the sheets are treated in this way, then these sheets when being laid or after having been laid will no longer warp or form bulges, at least no real bulges except the very shallow ones that may have remained in spite of the treatment stated.

The undulations may extend transversely or obliquely with respect to the longitudinal direction of the sheets, or in the same direction. It would appear that by the previous formation of the undulations the texture or grain of the material has been so permanently fixed that the subsequent formation of additional undulations is thereby prevented.

This is the case even if the previous undulations have been only comparatively shallow ones. Instead of the undulations being formed only one time, they may be formed several times. In this respect it has been found advantageous to let the second set, the third set, and so on, of the undulations extend in a direction other than that of the first set, and so on. Thus if, for instance, the first set extended transversely with respect to the direction of the sheet, the second set may extend longitudinally with respect thereto, and so on. The formation of the undulations can be facilitated, and the undulations may be reinforced, by moistening and then heating the sheets during the formation of the undulations and thereafter, and the procedure may be carried out so that the soaked paste-boards, papers, felts, or the like, after having passed through the squeezing rollers or scraping-off devices are substantially flat or else are provided with more or less shallow undulations. This depends upon the condition or state, especially upon the hardness and the toughness, of the raw sheets, also upon the degree of moistening and of heating the sheets; it furthermore depends upon the shape of the undulations, the pressure exerted when producing them, and finally, upon the amount of pressure and the tension to which the sheets are subjected after the formation of the undulations, as well as after another soaking.

It is, of course, also possible to proceed in a manner whereby the raw non-soaked sheets of paste-board, paper, felt, or the like, are undulated and the undulations are then again removed wholly or partly by subjecting the sheets to the action of rollers or squeezing devices or to a strong pull, the soaking being effected only thereafter.

If this procedure is carried out as advocated, so that after the treatment shallow undulations remain in the sheets there is attained, besides the changed texture or grain of the material, the further advantage that the paste-boards etc., have a larger actual area than the plane proper of the respective sheet owing to the existence of said undulations. This results in the further advantage that if the paste-board sheets or the like should expand or contract after they have been laid, this expansion or contraction will take place within the space of every individual shallow undulation or bulge; so that even if the roofing material is sbjected to stronger and greater influences, for instance, very intense changes of temperature, or distortions of the supporting surface, such as can occur due to irregular setting of the building, the greatly feared tearing of the roofing and of the insulating material is completely prevented, or else the detrimental influence can act in a far more severe degree than heretofore possible, before undulations or bulges are formed or the material tears.

Such paste-boards etc., especially if they have been soaked with a tar-free substance or composition, but have not been provided with a thick covering, or even if the sheets have been manufactured from a hard raw material, especially material without much wool, may be laid in the natural way, viz. the sheets may be laid parallel with respect to the rain-gutter, without any fear that they may tear or form undulations or bulges. In this manner, rain water or any other liquid may flow over the superposed edges of the sheets without entering therebetween.

Such impregnated previously undulated paste-boards may be provided in a convenient manner, prior to being laid or thereafter, with coatings consisting, for instance, of substances, the melting points of which lie above those of the substances constituting the impregnating composition, and there may be embedded in said coating compositions wires, threads, nettings or fabrics; colored coatings, for instance coatings containing powdered metals, may be used.

I am aware of the fact that also formerly waterproof and transversely undulated paste-boards, especially such with transverse undulations of dove-tailed transverse section, have been used for insulating, as well as for roofing purposes. This, however, has been done without destroying wholly or partly prior, to the respective use, the bulges or undulations.

The employment of paste-boards of this kind is, indeed, very suited for a number of purposes, especially where air-insulated layers, or dove-tailed undulations for holding fast plastering, or a particularly great rigidity produced by means of high undulations is desired. On the other hand, there are many purposes for which it would be unsatisfactory as well as too expensive, to make use of paste-boards, the undulations or bulges of which have not been destroyed prior to the use, especially where the formation of air-insulated layers, or the holding fast of plastering, or the attainment of a particularly great rigidity, is not aimed at; the high cost is due to the fact that the undulations or bulges as originally produced, and as remaining, require far more raw paper, paste-board, and felt material, also more of the soaking or/and coating or painting or/and covering substances where such are used. The high cost is further due to the fact that the dipping procedure, as necessary for the maintenance of the undulations or bulges, requires considerably more time and is also by far more complicated than the dipping-in procedure and the drawing-through procedure employed in the quantity production of said paste-boards etc. Besides, the high undulations increase too much the bulk of said paste-boards etc., and as a consequence these latter are of no use for certain purposes, such, as, for instance, the water-proof covering of roofs. It is therefore one of the objects of the present invention to overcome the formation of the bulges in question in flat or nearly flat roofing materials.

If a plurality of undulations is to be made, the second set of undulations also may be made after the paste-boards, papers, felts, or the like have already been soaked and, perhaps, also provided with a covering. Also, the second set of undulations, especially if these latter extend in the longitudinal direction of the sheets, need not be removed, the less, as these undulations are mostly very shallow, in that these undulations cannot during their formation exert a shifting action upon the material, such as is, however, at once possible, and occurs, with transverse undulations.

Now, I have discovered that it is quite feasible to produce undulations extending in the longitudinal direction of the sheets and this, in fact, even to a very material degree, if the paste-boards, papers, felts, and the like, consist of a tough material; the height of the undulations may be about 50% of the width of the same. Furthermore, I have discovered that even with very shallow undulations the height of which is only 5% or even less with respect to their width, the warping and the tearing can be either completely obviated or they can be very considerably diminished. When producing such shallow undulations the material is stretched to such a small degree, that also less tough paste-boards, papers, felts, and the like, prove sufficiently extensible for this purpose.

Also the procedure of making longitudinal undulations in the sheets can be carried out in a simple manner by rolling the sheets through between one pair or several pairs of profiled squeezing rollers. Sheets undulated in this way, when being laid on roofs, are laid preferably in the direction from the rain gutter to the ridge, and in the case of wand linings they are attached in the direction from below to above, viz. always in the longitudinal direction of the sheets.

A particular embodiment of the present invention is that in which the longitudinally undulated paste-boards, papers, felts, or the like, have previous to the formation of the undulations been soaked or coated as to be rendered waterproof.

Finally, I have discovered that these paste-boards, papers, felts, or the like, are particularly suited for sound-damping, also as bad conductors of heat, this being due, it seems, partly to the less rigid condition or state of the material, and partly to the very shallow air-filled hollow spaces formed when the paste-board etc., having the shallow undulations in question, are being laid.

If the transverse or the longitudinal undulations are produced already in the raw, unsoaked paste-board etc., the dripping procedure whereby the successive sheets or layers are rolled into the soaking mass in loop form, the particular further advantage is attained that the soaking mass can enter through the hollow undulations into the layers by far more thoroughly than is possible with such layers as lie flat upon one another, the soaking being, thus, considerably more complete and practically perfect where the improved method just stated is used.

The invention is illustrated diagrammatically and by way of example on the accompanying drawings, in which:

Fig. 1 is chiefly a longitudinal section through, and partly a perspective representation of an apparatus for the manufacture of paste-boards, papers, felts, and the like, corresponding to my invention;

Figs. 2, 3 and 4 are sections through undulated paste-boards made according to this invention, the undulations becoming gradually shallower;

Fig. 5 is a plan of a piece of undulated paste-board having transverse undulations;

Fig. 6 is a transverse section through this piece along line VI—VI of Fig. 5;

Fig. 7 is a longitudinal section along the line VII—VII of Fig. 5;

Fig. 8 is a plan of a piece of undulated paste-board or the like having transverse as well as longitudinal undulations;

Fig. 9 is a section along line IX—IX of Fig. 8;

Fig. 10 is a section along line X—X of Fig. 8;

Fig. 11 is a plan of a piece of undulated paste-board or the like having solely longitudinal undulations;

Fig. 12 is a section along line XII—XII of Fig. 11;

Fig. 13 is a transverse section along line XIII—XIII of Fig. 11;

Fig. 14 shows a pair of rollers, viz. the rollers K of Fig. 1; and

Fig. 15 is a view similar to Figs. 7 and 9 and is more fully dealt with hereinafter, as are also all the other figures.

Referring to Fig. 1, B denotes the unsoaked raw material, i. e. the continuous sheet of paper, paste-boards, felt, or the like, which unwinds from a roll A. C denotes a pair of rollers resembling cog-wheels in transverse section and providing the sheet B with undulations of the shape shown in said figure. The rollers C may be so designed as to be adapted to be heated, and in front of them may be provided nozzles or the like conducting steam under pressure onto the upper and/or the lower surface of the sheet A in order to moisten and to heat it. The undulated sheet (now designated by D) is then conducted, with the air of a rotating roller E, through a trough F containing a hot impregnating composition or mass F', for instance, a molten bituminous substance or mixture, through which the undulated sheet D is drawn.

As a consequence, the undulations are stretched a little, i. e. they are stretched for the first time. Thereafter the sheet D passes through between two squeezing rollers G, by which the undulations are stretched or flattened a second time.

Now the sheet is conducted by another rotating guide roller J through another receptacle H which contains a hot coating or covering mass, the melting point of which is preferably somewhat higher than that of the mass in the preceding vessel. From the receptacle H the still somewhat undulated sheet passes through between another pair of squeezing rollers K which are profiled circumferentially, that is to say, profiled in the manner shown in Fig. 14, so that the sheet is now undulated in its longitudinal direction. Thereafter the thus treated sheet passes further onward below a trough or vessel L containing some suitable pulverulent substance which is strewed upon the upper surface of the sheet. Finally, the now finished sheet M is wound upon the roller N.

This finished sheet has thus, shallow transverse undulations, as well as shallow longitudinal undulations (Fig. 8). In the Figs. 1, 2, 3, 4, 7 and 9, the undulations are represented, for the sake of clarity, higher than they are in reality. I wish it to be understood that the sequence in which the undulations are made may be the reverse of that above described, and that it is also possible to produce the longitudinal undulations already in the raw, unsoaked paper, etc. It is, further, possible to purchase the sheets directly in undulated state from a paste-board etc., factory. Furthermore, it is possible to provide between the smooth roller J and the grooved rollers K a pair of smooth squeezing rollers squeezing off any surplus of the coating or covering mass. Finally, the longitudinal undulations may be provided also after the sheet has passed away below the strewing trough L.

The longitudinal undulations need not extend over the entire width of the sheet, but one of the edges thereof, or both edges, may remain flat so that it may be easier to connect adjoining sheets tightly with one another for instance, by gluing them together or nailing them upon one another, and so on. In Fig. 15, $d^3$ denotes a piece of undulated paste-board having a flat edge $d^4$ at either side.

I claim:

1. The method of producing a material of the character specified, which consists in undulating sheet pasteboard material, impregnating it with a substance rendering it waterproof, and subsequently at least partly removing the undulations therefrom.

2. The method of producing a material of the character specified, which consists in undulating said material in one direction, impregnating said material with a substance rendering it waterproof, at least partly removing the undulations therefrom, and subsequently undulating said material in a different direction.

3. The method of producing a material of the character specified, which consists in undulating said material in one direction, impregnating said material with a substance rendering it waterproof, at least partly removing the undulations therefrom, covering said material with a coating substance, and subsequently undulating said material in a different direction.

4. The method of producing a material of the character specified in continuous sheet form, which consists in undulating said material so as to produce undulations running transversely thereof, impregnating said material with a substance rendering it waterproof, undulating said material so as to form undulations extending longitudinally thereof and so as to depress partly the undulations previously produced, and providing the thus treated material with a covering.

5. The method of producing a material of the character specified in continuous sheet form, which consists in undulating said material so as to produce undulations running transversely thereof, impregnating said material with a substance rendering it waterproof, at least partly removing from said material the undulations thus produced, subsequently undulating said material so as to produce undulations running longitudinally thereof, and providing the thus treated material with a covering.

6. The method of producing a material of the kind described which comprises undulating a sheet of material, impregnating the undulated sheet with a waterproofing liquid, and at least partly removing the undulations from the sheet before it dries.

In testimony whereof I affix my signature.

AUGUST WILHELM ANDERNACH.